April 17, 1928.
H. P. BOSTAPH
THREAD CUTTER
Filed Aug. 6, 1923
1,666,162
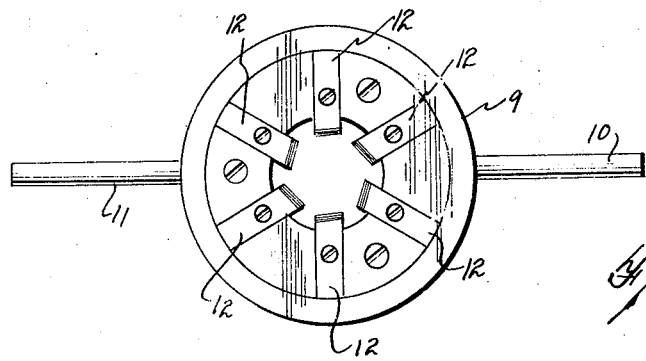
Fig. 1
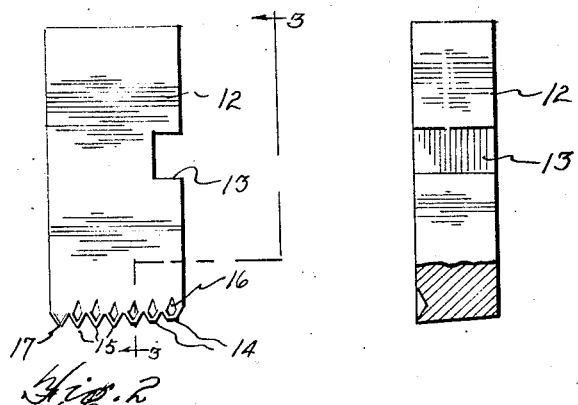
Fig. 2
Fig. 3
Fig. 4
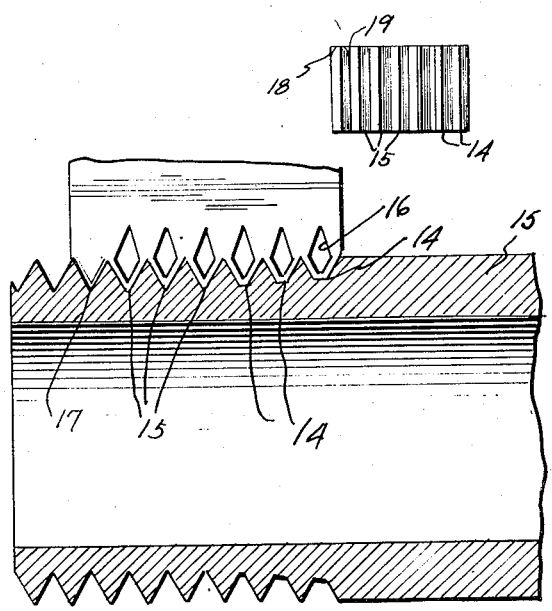
Fig. 5
INVENTOR.
Harvey P. Bostaph
BY
ATTORNEY.

Patented Apr. 17, 1928.

1,666,162

UNITED STATES PATENT OFFICE.

HARVEY P. BOSTAPH, OF DETROIT, MICHIGAN.

THREAD CUTTER.

Application filed August 6, 1923. Serial No. 655,944.

My invention relates to a new and useful thread cutter for use in cutting threads on pipes and the like or for tapping out nuts, etc. The object of the invention is the provision of a thread cutter so constructed as to cause the cutter to cut exactly the number of threads per inch that it is measured and designed to cut.

In cutting threads where a large number of threads is to be cut the thread cutter, through the rearward thrust of the material it is operating upon, is often thrust backward upon the threads already cut so that instead of advancing over the material the proper distance during each turn the cutters are advancing a less distance and cutting off a slight amount from each thread within the cutter, with the result that these threads are of less thickness than designed to be and are of a greater number to the lineal inch than should be. This is particularly the case where pipe is being threaded and is of more frequent occurrence and more pronounced when inequalities in the pipe are met.

To provide against this backward thrust of the cutter so that the edges of the cutting teeth come into contact with the side walls of the formed teeth within the cutter, I form one of the teeth of the cutter, preferably the rear tooth, with a blunt or non-cutting edge, so that when the backward thrust comes this tooth rides in the channels already formed and does not cut the face of the teeth against which it engages. Since this tooth is non-cutting the other cutting teeth are not permitted to cut off any of the face of the teeth already formed and the proper number of teeth, each having the proper thickness, will be found in each inch. The same principle may be used with a tap for threading nuts and the like, as will readily appear as the description proceeds.

Another object of the invention is to provide a thread cutter which will present a sharply defined and highly efficient cutting edge to the material operated upon, this feature being also adapted for use with a threading cutter for pipes, rods and the like, or a tap for forming internal threads. This feature of the invention resides in forming a recess in the advancing face of the cutting teeth, so that sharp edges are presented at opposite faces of the teeth.

Other objects will appear hereinafter.

The invention consists in the combination and arrangements of parts hereinafter described and claimed.

The invention will be best understood from a reference to the accompanying drawings which form a part of this specification and in which, Fig. 1 is a top plan view of a stock carrying the invention, Fig. 2 is a side elevational view of a cutter embodying the invention, Fig. 3 is a sectional view taken on substantially line 3—3 of Fig. 2, Fig. 4 is a bottom plan view of a cutter embodying the invention, and, Fig. 5 is a sectional view showing a cutting member in operation on a pipe.

The invention in its preferred form compries a cutter 12 which is provided with a recess 13 adapted for engagement with a stock 9 having handles 10 and 11. In use a number of these cutting members are mounted in a stock and each cutting member is provided with teeth for engagement with the work piece and cutting the threads therein. A number of these teeth 14 are shortened and provided with flat ends, these being the teeth which first engage the work piece and serve to score it without cutting a deep thread. To the rear of these teeth are other full sized teeth 15 which serve to cut the thread and form the channels between the same of the proper depth. To provide a sharp and well defined cutting edge on the front face of the teeth a recess 16 is formed in the front face of the teeth so as to present an edge along the edges of the teeth. To the rear of the full sized teeth is a tooth 17 which is also of full size but which has its cutting edges 18 and 19 rounded so as to blunt the same and present a surface which will ride over the teeth already formed without doing any cutting. This tooth is not a cutting tooth but may be termed a guide tooth, which rides in the channels already formed. In this way this tooth serves as a guide to maintain the other teeth in their respective channels and prevents the cutting teeth from shaving off any of the faces of the formed teeth as the natural backward thrust takes place on the advance of the teeth over new material.

In the use of the invention with taps for threading nuts and other devices having an internal thread the same principle would be used, by providing a guide tooth to ride in the formed channels. The position and number of these teeth is optional with the operator, although I prefer to employ the rear tooth as the guide tooth. One of these guide teeth may be employed on each cutting member or any number of cutting members as desired by the operator and in the case of a tap the guide tooth may appear in only one row or in all rows of the cutting teeth.

In forming the recess in the advancing face of the cutting teeth added efficiency of the cutting member is attained and the material removed when the threads are being cut is removed much after the manner the material is removed by a cutting tool of a lathe. The material comes out in longer strips and is really cut out instead of being pushed out in small pieces as is the custom with thread cutters as now used.

While I have illustrated and described the preferred form of construction I do not wish to limit myself to the precise form of structure shown but desire to avail myself of such variations and modifications as come within the scope of the appended claims.

Having thus described my invention what I claim as new and desire to secure by Letters Patent is:

1. A threading device comprising a cutting member having cutting teeth formed thereon, said teeth having a recess formed in the advancing face of said teeth adjacent to and inwardly of the cutting edge thereof; and a guide tooth, free from a cutting edge, adapted for riding in the channels formed and for resisting the backward thrust of said member.

2. A threading device comprising, a cutting member having cutting teeth formed thereon, said teeth having a recess formed in their advancing face positioned within the marginal limits of said teeth and spaced by a portion of said teeth inwardly from the cutting edge thereof.

In testimony whereof I have signed the foregoing specification.

HARVEY P. BOSTAPH.